United States Patent

Ashley

[15] 3,641,519

[45] Feb. 8, 1972

[54] MEMORY SYSTEM

[72] Inventor: Albert H. Ashley, Bedford, Mass.

[73] Assignee: Sylvania Electric Products Inc., Wilmington, Del.

[22] Filed: Apr. 10, 1958

[21] Appl. No.: 727,602

[52] U.S. Cl. ............340/174 RC, 340/174 M, 340/174 NC, 340/174 DC, 340/174 WA, 340/174 PD, 340/174 VB

[51] Int. Cl. ....................................G11c 7/02, G11c 11/06

[58] Field of Search...........................340/174 L, 166 C, 174

[56] References Cited

UNITED STATES PATENTS

| | | | |
|---|---|---|---|
| 2,776,419 | 1/1957 | Rajchman et al. | 340/166 |
| 2,781,503 | 2/1957 | Saunders | 340/174 C |
| 2,784,391 | 3/1957 | Rajchman et al. | 340/174 C |
| 2,802,203 | 8/1957 | Stuart-William | 340/174 C |
| 2,889,540 | 6/1959 | Bauer et al. | 340/174 C |

*Primary Examiner*—James W. Moffitt
*Attorney*—J. Albert Hultquist and Francis I. Sullivan

[57] ABSTRACT

A ferrite-core memory system employing a specimen magnetic core or memory device, having the same operating characteristics as the memory elements, to generate the requisite strobe pulses for addressing the memory.

18 Claims, 6 Drawing Figures

INVENTOR.
ALBERT H. ASHLEY
BY F.J. Sullivan
ATTORNEY

INVENTOR.
ALBERT H. ASHLEY
BY F. J. Sullivan
ATTORNEY

INVENTOR.
ALBERT H. ASHLEY
BY F. S. Sullivan
ATTORNEY

INVENTOR.
ALBERT H. ASHLEY

BY F. I. Sullivan

ATTORNEY

MEMORY SYSTEM

This invention is concerned with memory systems for electronic computers and other data processing equipment and, particularly, with improved devices and techniques for reading out the information stored or processed in such systems.

Copending U.S. Pat. application of the same assignee, Ser. No. 679,967, filed Aug. 23, 1957, and now U.S. Pat. No. 3,058,096, describes a magnetic core memory system. This application and the literature referenced therein may be consulted for detailed description of such memories, their operation, and associated input and output circuitry.

A typical memory comprises a plurality of ferrite cores connected in a matrix arrangement. When an individual core is pulsed by a current of sufficient magnitude and a given polarity, its residual magnetic flux is set in one direction where it remains until it is reversed by a pulse of opposite polarity. This reversal of flux induces an output signal in a sense winding linking the core. In this manner, a binary bit of information (zero or one) may be written-in, stored and read out of each core in the system.

The general arrangement of a memory matrix is in planes with the cores of each plane in horizontal rows, X, and vertical columns, Y. Flux reversal in a given core is accomplished by applying a current pulse of half the necessary amplitude to both its X and Y coordinates. The combined effect where the coordinates intersect is then sufficient to switch that particular core from one state of remanent magnetic flux to another.

This signal storage property of ferrite cores, along with other qualities such as durability, retention of state during power failure, etc., makes them very desirable as memory devices. There are, however, practical difficulties in operating such memories because two kinds of signals are induced into the sense output of a core. One signal type is the result of flux reversal when a one is read out. The other is the cumulative noise and spurious output resulting from "half-reading" the other cores along the X and Y coordinates of the core which receives the full read pulse. This cumulation can reach the voltage amplitude of a read one pulse and result in a stored zero being mistaken for a one.

An established technique for preventing this confusion of signals has been to take advantage of the fact that the noise due to driving pulses precedes in time the flux reversal which indicates a one. Consequently, strobing the sense output circuit, i.e., making it sensitive only during the period of flux reversal, makes it possible to detect in the output only the desired flux reversal signals.

Hitherto, the most accepted manner of strobing the sense circuit has been to connect it to an AND gate which has as its other input a strobe pulse controlled from a master clock. The time when the driving noise will have subsided and flux reversal of the stored signal is taking place is estimated, or discovered empirically, and the strobe pulse is set to activate the AND gate during the critical period of flux reversal only. This preset strobing is not completely reliable, however, because the switching time of the cores varies with changes in drive voltage, environmental temperature, component replacements, etc.

Accordingly, an object of the present invention is to provide an improved means for sensing the output of memory systems and other data processing networks. Another object is to provide for a more reliable strobing of the sense signal output of magnetic cores and other memory elements.

This is accomplished in one embodiment of the invention by strobing the sense output of a magnetic core memory matrix with a pulse controlled by a specimen magnetic core or memory device having the same operating characteristics and affected by the same voltage gradients, temperature variations, component changes, etc., as the similar storage elements of the memory itself.

Other objects and features of the invention will be apparent from the following description and reference to the accompanying drawings, wherein.

Figure 1:
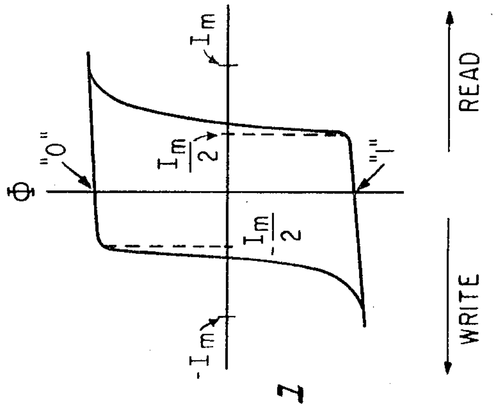
FIG. 1 is a diagrammatic representation of the hysteresis loop of a magnetic core memory element.

The principal features of a magnetic core which make it useful as a binary information storage device in a memory system are diagrammed in FIG. 1. These are the properties of setting its state of remanent magnetic flux in one direction when a current of critical amplitude and proper polarity is pulsed through a driving winding linking the core, reversing the flux and inducing an output signal in a sense winding as a result of a full drive pulse of opposite polarity, and holding its state of flux substantially unchanged under the influence of driving currents of less than the critical magnitude.

In FIG. 1 the so-called square hysteresis loop of a typical ferrite memory core is shown. A positive driving pulse $I_m$ will switch the core from low to high state of flux; and a negative driving pulse $-I_m$ will return it from high to low flux state. Pulses of up to half these magnitudes, Im/2 and −Im/2, have no significant effect on the flux state of the cores.

If we assign to the positive and negative pulses the respective functions of reading and writing information, a full negative pulse $-I_m$ will "write" a binary one into the core and a full positive pulse $I_m$ will "read" this one from the core by producing a flux reversal and, in the process, inducing a signal in a sense-winding linking it. If a core is in the zero state, a half-write pulse will produce a minor disturbance but will not cause the flux reversal necessary to write a binary one. Similarly, a half-read pulse will disturb a stored one but will not produce the flux reversal necessary to change the state of the core and read out a stored one. Thus, by proper pulsing, a magnetic core can be caused to write-in, store, and read out the ones and zeros of a binary mathematical system.

Figure 2:
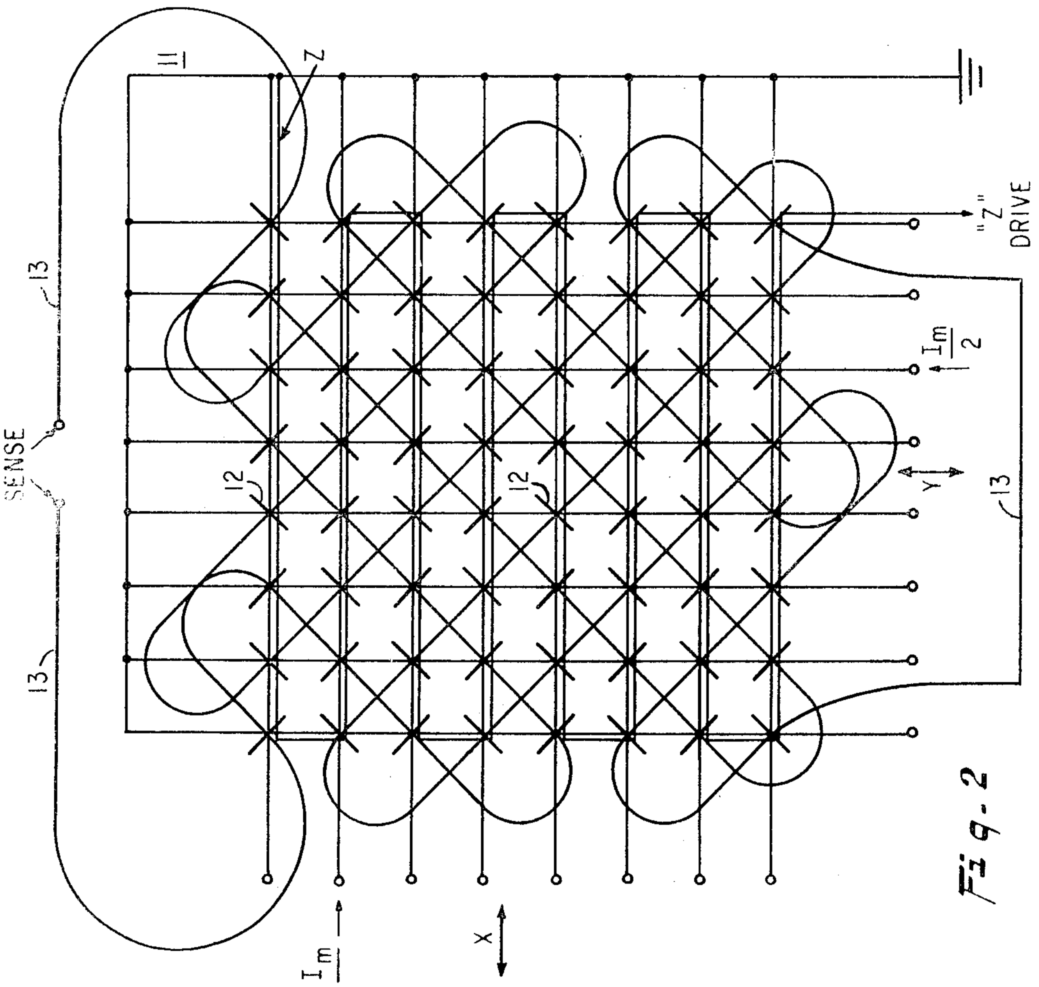
FIG. 2 is a diagrammatic representation of a magnetic core memory plane.

FIG. 2 represents a memory plane 11 comprising a number of magnetic cores 12 arranged along X and Y coordinate rows of conductors linking the cores. Current pulses of half the magnitude necessary to switch a core and thereby reverse its flux may be fed selectively to each of the X and Y coordinate conductors. Thus, pulsing any given X or Y conductor alone has no significant effect on any of the cores, but if a single X and a single Y coordinate are pulsed simultaneously, a full $I_m$ pulse of sufficient magnitude to accomplish flux reversal, is applied to the core at their intersection. The other cores along each of the coordinates will receive merely Im/2 pulses, and although their state of flux may be disturbed it will not be reversed. Thus, by applying positive or negative Im/2 pulses to selective X and Y coordinates, information can be written into or read out of any particular core desired.

A sense winding 13 is shown linking each of the cores 12 in the plane 11. Each time a flux reversal in any of the cores takes place, a signal is induced in this winding. This is the output of the plane.

A Z winding is also shown linking each of the cores 12 in the plane 11. This is used each time a writing cycle takes place to provide a half-read pulse when it is desired to write a zero. It is possible to write a one in a particular core by providing −Im/2 pulses to its X and Y coordinates, and to write a zero by withholding the pulse from either or both of its coordinates. For practical circuit reasons, however, each time a core is addressed in a writing cycle half-write pulses are applied to both its coordinates so that it will write a one. If a zero is desired instead, a half-read pulse, which cancels the effect of one of the half-write pulses, is fed to the Z drive linking all of the cores in the plane. The net result is an effective single −Im/2 pulse at the core linking the intersection of the pulsed X and Y coordinates causing this core to store a zero instead of a one.

Figure 3:
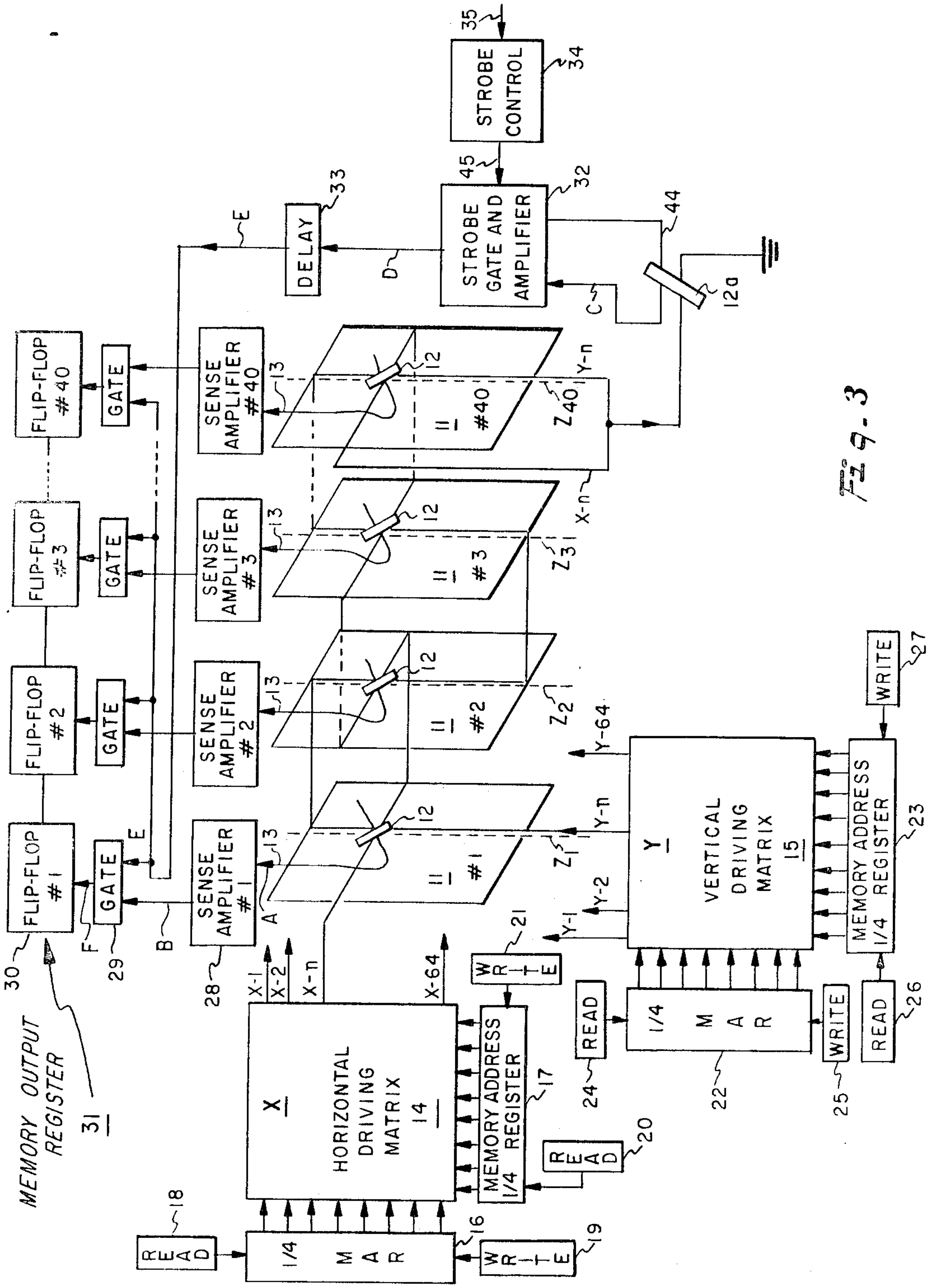
FIG. 3 is a block diagram of a magnetic core memory system incorporating one embodiment of the invention.

The magnetic core memory system shown in FIG. 3 comprises a plurality of memory planes 11 interconnected with each other to provide a memory matrix. The memory shown has 40 individual planes with each plane having 64 horizontal, X, rows and 64 vertical, Y, columns, a total of 4,096 separate cores. This three-dimensional combination provides 4,096 separate groups of cores with 40 cores in each group. Thus, with each core storing a single bit of information, the memory has capacity for 4,096 words, each 40 bits long.

The core switching pulses are provided by a horizontal driving matrix 14 and a vertical driving matrix 15. Horizontal matrix 14 has eight horizontal inputs from a pulse control network 16 and eight vertical inputs from a pulse control network 17. The horizontal pulse control network 16 comprises a quarter of the memory address register, and connects reading pulses from a source 18 or writing pulses from a source 19 selectively to the eight horizontal driving matrix input lines. The control 17 for the eight vertical driving lines comes from a second quarter of the memory address register and processes read pulses from a source 20 or write pulses from a source 21 to selected vertical inputs in the matrix 14.

The vertical driving matrix 15, similarly, has a horizontal control 22 and a vertical control 23 comprising the third and fourth quarters respectively of the memory address register. The horizontal read and write pulses are processed by the control 22 and derived from sources 24 and 25 respectively; and similar pulses for the control network 23 are derived from read pulse source 26 and write pulse source 27.

As explained above, each memory plane 11 in the system corresponds to a single digit of each stored word. The sense output winding 13 of each plane is connected to a sense amplifier 28; and, through a gate 29 to a separate flip-flop 30 in the word length memory output register 31.

The processing of a pulse from the sense output winding 13 to a flip-flop 30 is controlled at each gate 29 by a strobe pulse originating in a strobe output core 12*a* which is connected to each gate 29 through a strobe gate and amplifier 32 and a delay 33. The gating signal of the amplifier 32 is determined by a strobe control circuit 34 synchronized through a connection 35 to the master synchronizing clock of the overall system (not shown).

The system shown in FIG. 3 operates in the following general manner to write in, store, and read out information, with the read out controlled by the output strobe control core 12*a*.

Information is stored in a given word location of the memory by pulsing a particular X-n horizontal driving line and a particular Y-n vertical driving line to set each core in a corresponding location in each one of the 40 memory planes 11 of the system to a write one condition of flux. If it is desired to write a zero instead of a one in any bit of the word, the Z winding of the memory plane 11 corresponding to that particular bit is given a half-read pulse to prevent the automatic one from being written in.

Subsequently, an Im/2 half-read pulse is applied to the same X-n and Y-n coordinates to read out the information stored in the cores at their 40 intersections. The consequent output signals are processed through sense amplifier 28 and gate 29 to set the various flip-flops 30 of the register 31 in a condition corresponding to the information stored in each of their respective cores 12 at the time the reading pulses are applied.

An essential feature of the invention resides in the manner in which a strobe pulse is provided to the gate 29 at the proper time to insure that the flip-flop 30 will be triggered only by flux reversal of the cores and not by spurious pulses and random noises. This is accomplished by applying to core 12*a* the same writing and reading pulses that are applied to each of the cores 12 in the memory proper. Thus, if the amplitude or rise time of the driving pulses should vary, environmental temperature should change, or circuit parameters be altered, etc., with accompanying changes in the response time of the cores, the strobe pulse period will always correspond with the flux reversal period of the cores 12 because it is determined by flux reversal in the core 12*a* which is affected by the same voltage and temperature gradients, etc., as the memory cores. This strobe core 12*a* writes or reads a one each time any core 12 has a signal written in or read out because it is located in the common ground return of all of the X and Y coordinate drives.

In more detail, the system functions as follows. When it is desired to store a particular word of information, the address of the desired memory location is set into the memory address register. The first quarter 16 of this register connects one of the horizontal inputs of the horizontal driving matrix 14 to the write pulse source 19. Similarly, the second quarter of the register 17 connects a selected vertical input of the drive matrix 14 to write pulse source 21; the third quarter of the register connects a horizontal input of the vertical drive matrix 15 to write pulse source 25; and the fourth-quarter 23 of the register connects a vertical input of the driving matrix 15 to write pulse source 27.

The effect of this selection is to provide a −Im/2 pulse to the horizontal coordinate X-n and another −Im/2 pulse to the vertical coordinate Y-n. These coordinates are serially connected, as shown in FIG. 3, through the same respective coordinate rows and columns of each of the planes 11 to a common ground.

The effect of thus applying half-write pulses to the core located at the intersection of the X-n and Y-n coordinates in each of the 40 planes is to set the flux of each one of these cores in a write one condition.

Simultaneously, with this selective addressing and driving of the X and Y coordinates with half-write pulses, a half-read pulse is applied to the Z winding linking the cores of each plane where it is desired to write a zero instead of a one. The effect of this half-read pulse in the Z or "inhibit" windings is to cancel one of the half-write pulses. This results in the selected core of that particular plane receiving only an effective half-write pulse which may disturb its flux condition but will not reverse it. Since the reading operation, which precedes the writing cycle, has left all of the cores in a zero condition, the write operation just described will result in a one or a zero being selectively written into the selectively addressed core 12 of each of the 40 memory planes 11 representing the 40 bits of the word to be stored.

When it is desired to read a word out of storage, the memory address register is set to the condition corresponding to the location of this word in the storage and positive Im/2 half-read pulses are applied to the particular X-n and Y-n coordinates of the memory in the manner described previously for the negative Im/2 half-write pulses. The effect is to apply a half-read pulse to each core along the X-n and Y-n coordinates in every plane and a full $I_m$ pulse to the core 12 where these coordinates intersect in each of the forty planes. This results in a reversal of flux where a one has been stored in the selected cores and some disturbance of the flux, but not a reversal, in all of the other cores which have received half-read pulses.

Figure 4:
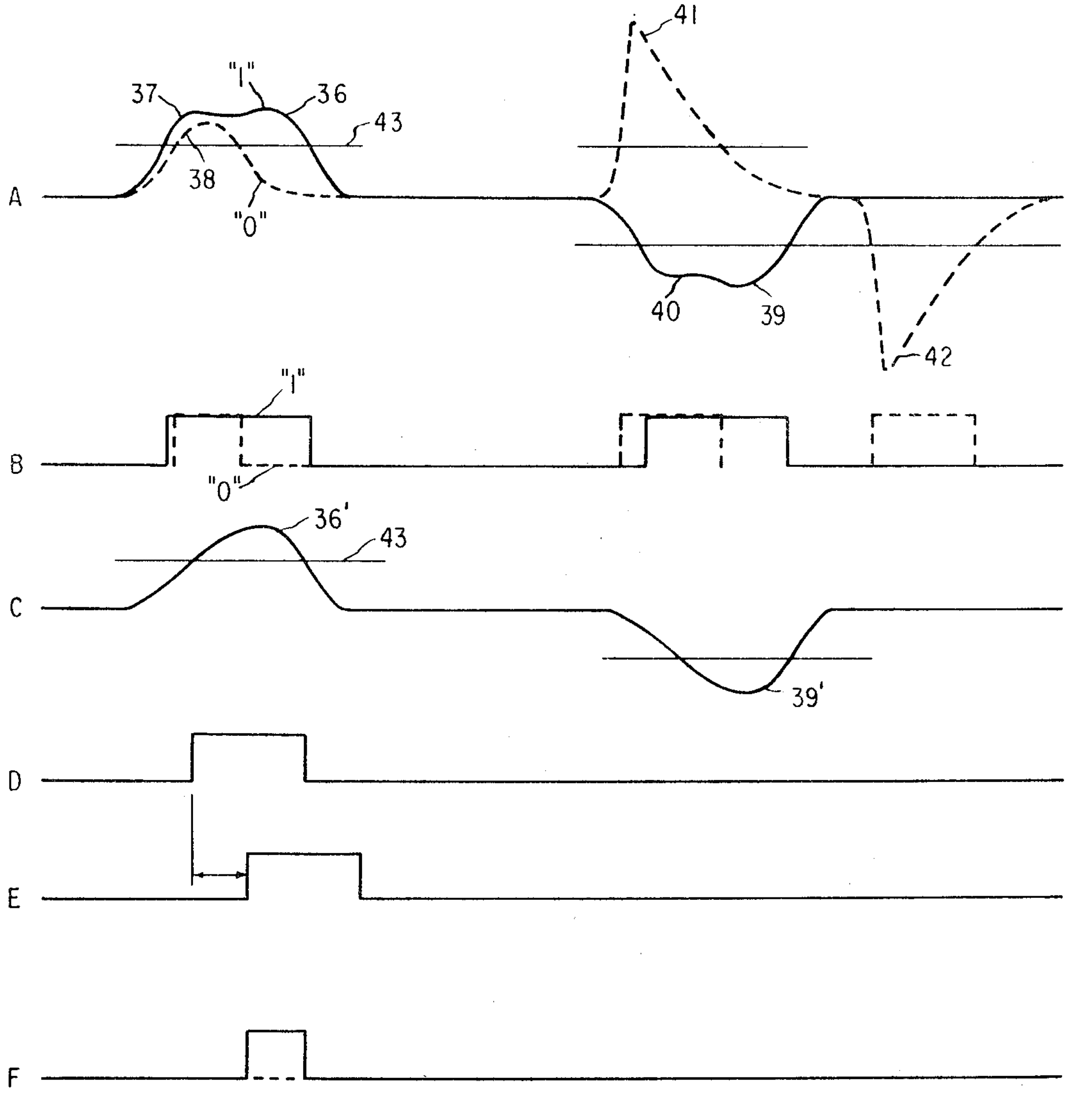
FIG. 4 is a diagrammatic representation of voltage pulses and signals at indicated points in the system of FIG. 3.

As explained previously, each of the planes has a sense output winding 13 linking all of its cores 12. When a particular X and Y coordinate are pulsed, each one of these sense windings has a series of signals induced into it. (See FIG. 4.)

FIG. 4A shows the signals induced, under the most troublesome conditions, in sense winding 13 as they are applied to the sense amplifier 28 at A. The signal contribution of cores reading and writing ones is shown in full line and that of cores reading and writing zeros is shown in dotted line. The effect of flux reversal for a read one is shown at 36; and, the effect of cumulative disturbance from half-read ones and zeros for a full read one and a full read zero is shown respectively at peaks 37 and 38. When writing pulses are applied the signal resulting from the flux reversal of a write one is shown at peak 39. The cumulative disturbance of half-writes is shown at 40; and the signals resulting from the rise and fall of the half-read inhibit in the Z winding are shown at 41 and 42 respectively.

In order to overcome the effect of minor noises in the system, a threshold sensitivity is established by a discrimination level 43 which is set at an amplitude low enough to include the smallest signal representative of a stored one which may be expected in the system. A typical read one signal approximates 55 millivolts in the sense output, and discrimination at approximately 38 millivolts is generally adequate to include a minimum signal one. This discrimination is accomplished in the sense amplifier 28 and results in the square wave outputs of FIG. 4B which are applied as one input of the AND-gates 29.

The common ground return which links the strobe control core 12*a* receives a full-read and a full-write pulse each time information is read from or written into any memory core 12 of the system because it is connected to all of the X and Y coordinate drive lines and consequently receives a full-read and a full-write pulse whenever half-reads or half-writes are simultaneously applied to any pair of X and Y coordinates. The signal induced in the winding 44 is shown at peaks 36' and 39' of the voltage curves in FIG. 4C. None of the spurious signals resulting from the disturbance of other cores is experienced in this winding because it links only the core 12*a* which always receives full read or write pulses and no spurious-signal-inducing half pulses.

The output C from core 12*a* is fed as one input to the strobe gate and amplifier circuit 32 which discriminates the signal in the same manner explained for the output of the sense winding 13 and also performs an AND gate function with an input 45 from a strobe control circuit 34 which is actuated, through an input 35, by pulses from a master clock or synchronizing system (not shown) in such a manner that there is an output at D only during the reading cycle.

The gated output D from the strobe amplifier 32 is delayed, as shown at FIG. 4E, by a suitable device 33 to insure that the strobe pulse will commence at substantially the height of the flux reversal signal and not during its transition from the spurious disturbance signals which precede it.

The delayed strobe pulse E is applied to the gate 29; and results in an output F from that gate to trigger a flip-flop 30 of the memory output register 31 when the input B of the gate 29 is at its signal responsive level indicating the reading of a one, and no triggering when it is at the zero level.

Figure 5:
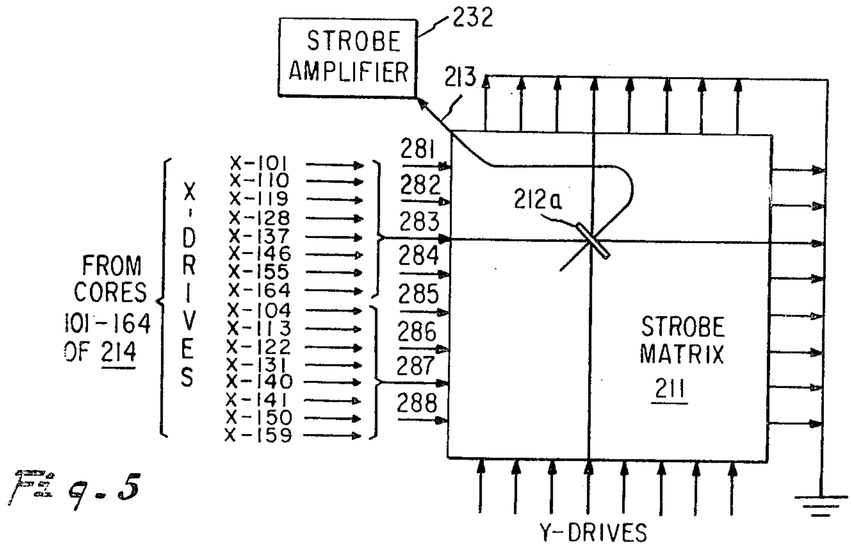
FIG. 5 is a block diagram of a modification of the invention.

A modification of the strobe output control of FIG. 3 is shown in FIG. 5. The single strobe core arrangement of the previous figure has given satisfactory performance in typical operating systems. There is a possibility, however, that some types of horizontal and vertical matrix drives will result in excessive current in the unselected drive lines so that the cumulative result in the common ground return circuit through the single core 12*a* will be an overdriving current which will switch strobe core 12*a* faster than the memory cores 12.

Under some conditions, this overdrive could be compensated by adjusting the delay 33. This technique, however, can become unreliable with variations in the rise time of the different pulses concerned and deterioration of various circuit components. To obviate complications of this sort, the modification of FIG. 5 is suggested.

The principal feature of this modification is the substitution of a matrix 211 of cores 212*a* for the single strobe control core 12*a* of the system shown in FIG. 3.

For the 64×64 memory matrix described previously, an 8×8 strobe control matrix is suggested. Instead of having all of the 64 and64 Y coordinate drives connected to a common ground as they come from the memory planes they are divided into subgroups connected separately through the matrix 211 to ground.

Figure 6:
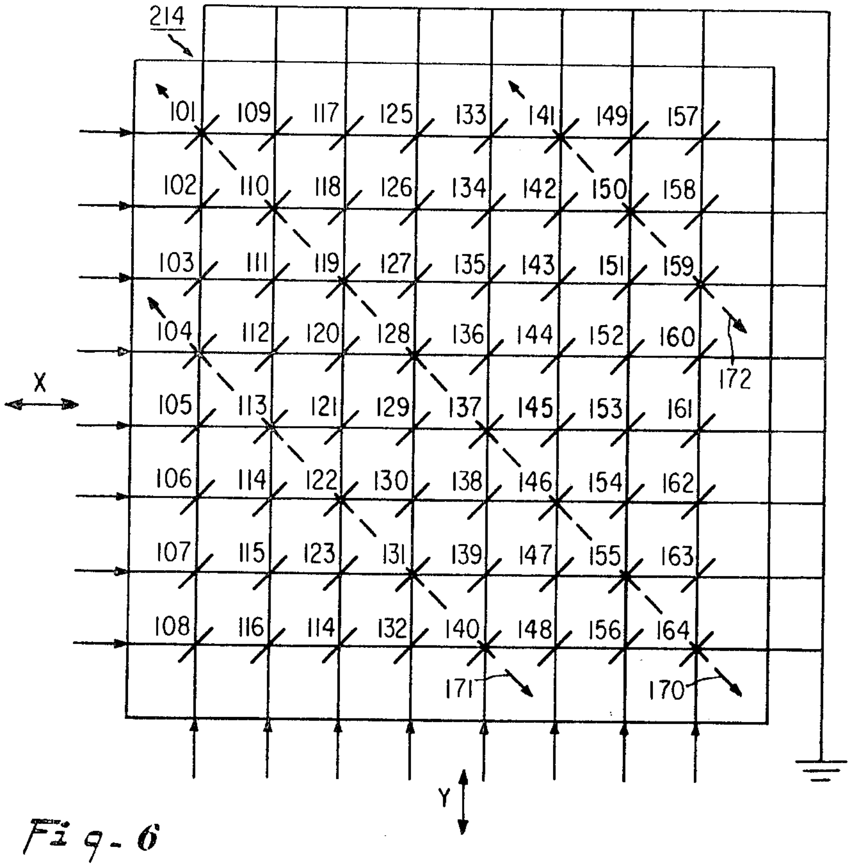
FIG. 6 is a diagrammatic representation of a driving matrix for a magnetic core memory plane.

FIG. 6 is a schematic diagram of a driving matrix 214 which corresponds to either the horizontal driving matrix 14 or the vertical driving matrix 15 of the system of FIG. 3. If we assume that this matrix 214 has eight horizontal and eight vertical inputs and a drive pulse switching core at each intersection of these coordinates, there is a switching core 101–164 for each of the drive lines, X-101–X-164, from the driving matrix 214 to the memory matrix, not shown.

Pulsing an X and a Y coordinate line in the driving matrix 214 of FIG. 6 produces a full Im/2 pulse in the core at the intersection of the coordinates and a disturbance signal ($I_n$) in the 14 other cores along its horizontal and vertical coordinates. Thus, the horizontal driving matrix 214 produces an Im/2 pulse in one line and an $I_n$ pulse in 14 other lines each time it drives the memory, and the corresponding vertical driving matrix (not shown) similarly produces another Im/2 pulse in one line and $I_n$ pulses in 14 other lines for a total current of $I_m$ plus 28 $I_n$ in the ground return through the strobe core this could amount to the troublesome overdrive referred to previously.

In the arrangement of FIG. 5 the 64 X horizontal and 64 Y vertical memory drive lines are each subdivided into eight groups of eight. Each group is connected to one of the respective eight horizontal and eight vertical inputs of the strobe matrix 211.

This subgrouping of the drives as they are connected to the matrix 211 follows the pattern of having each one of the eight X horizontal drivers from each vertical column and a separate horizontal row of the driving matrix 214 connected, through the memory planes to a separate one of the eight horizontal inputs (281–288) of the strobing matrix 211, and a similar connection of the Y vertical drivers from their driving matrix (not shown) to one of the eight vertical inputs of the strobing matrix.

This connection has been shown for horizontal inputs 283 and 287. Remembering that the diagram of FIG. 6 represents the 64 switching cores in the X horizontal driving matrix 214, and the requirement that one, and only one, core from each vertical column and each horizontal row of this matrix be connected to each of the horizontal inputs to matrix 211, note that drive lines X-101, X-110, X-119, X-128, X-137, X-146, X-155, X-164 corresponding to the cores 101, 110, 119, 128, 127, 146, 155, 164 along the diagonal line 170 across the matrix 214 represent one core in each of the X horizontal rows and vertical columns and are connected to the single horizontal input 283 of strobe matrix 211. Similarly, the drives X-104, X-113, X-122, X-131, X-140, X-141, X-150, X-159 correspond to cores 104, 113, 122, 131, and 140 along the line 171 in combination with cores 141, 150 and 159, along the line 172. These eight cores also satisfy the requirement of lying in a separate one of the eight horizontal rows and vertical columns of driving matrix 214.

As a result of this connection, each input to the strobing matrix 211 represents eight cores from the 64-core X driving matrix 214, one from each horizontal row and one from each vertical column. Consequently, each time one of the cores 101–164 is switched to provide a driving pulse to a memory coordinate X-n the input of the matrix 211 to which X-n is connected receives a one-half drive pulse Im/2, and each of the other seven inputs receives a two noise ($I_n$) pulse. Also, similar signals are derived from the Y vertical driving matrix (not shown).

Thus, the 8×8 strobing matrix corresponding to an 8×8 switching core driving matrix as described for 64×64 memory planes will provide the same drive to each selected strobe core as that to each core addressed in the memory proper. Consequently, there is no danger of overdriving the strobe core. Other arrangements are feasible, such as a 4×4 strobing matrix for a 64 output driving matrix. This has 16 driving lines connected to each of the strobe inputs e.g., the connections to 281 and 282, 283 and 284, etc., combined), to give the proportion of four noise currents in addition to the full drive to the selected strobe core, and provides satisfactory operation for most applications. Also, an extra memory plane with 64 horizontal and 64 vertical columns of cores could be used to provide a separate strobe control bit as an addition to each word in the memory.

The invention is not limited to the specific embodiment and modifications shown and described, but is applicable to other types of memories, switching circuits, and data processing systems, as defined by the following claims.

What is claimed is:

1. In an array which includes a plurality of magnetic cores arranged in rows and columns, and row and column coils inductively coupled to the cores in the different rows and columns, said coils being energized in selected combinations to excite cores in said array, the improvement comprising an additional bistable magnetic test core, input winding means coupling said test core, more than one of the column coils and more than one of the row coils being directly connected to said input winding means for switching said test core from an initial state to the opposite state upon coincident energization of a predetermined number of said row and column coils, and means for sensing a change of magnetic state of said test core as an indication of the character of operation of said array.

2. In an array which includes a plurality of magnetic cores arranged in rows and columns, and row and column coils inductively coupled to the cores in the different rows and columns, said coils being energized in selected combinations to excite cores in said array, the improvement comprising an additional bistable magnetic test core, a first input winding threading said test core, means directly connecting each of the row coils to said first input winding, a second input winding threading said test core, and means directly connecting each of the column coils to the second input winding, said test core being switched from an initial state to the opposite state upon coincident energization of one row coil and one column coil, and means for sensing a change of state of said test core as an indication of proper operation of said row and column coils.

3. An information storage matrix comprising a plurality of information storage devices, a reference storage device, a plurality of information sensing conductors associated respectively with said information storage devices, a reference sensing conductor associated with said reference storage device, readout means for inducing readout signals on said information and reference sensing conductors representative of the operative state of each of said information and reference storage devices, respectively, a strobe pulse generator operated responsive to a readout signal on said reference-sensing conductor for generating a strobe signal, and gating means operated responsive only to the coincidence of said strobe signal and said readout signals on said information sensing conductors for generating output signals indicative of said operative states of said information storage devices.

4. An information storage matrix comprising a plurality of information magnetic storage elements, a reference magnetic storage element, each of said information and reference storage elements being capable of assuming stable remanence states representative of particular information values, a plurality of information sensing conductors coupled respectively to said information storage elements and energizable responsive to the switching of said last-mentioned elements from a particular remanence state to another for providing information readout signals, a reference-sensing conductor coupled to said reference storage element and energizable responsive to the switching of said last-mentioned element from said particular remanence state to said other state for providing a reference readout signal, a strobe pulse generator energized responsive to said reference readout signal for generating a strobe signal, a plurality of gating means associated respectively with said plurality of information-sensing conductors, and circuit means for applying said strobe signal to each of said gating means, each of said gating means being responsive only to the coincidence of said strobe signal and said information readout signals on said information sensing conductors to provide output signals indicative of said particular remanence states of said information storage elements.

5. An information storage matrix according to claim 4 in which said plurality of gating means comprises respectively a plurality of amplifying means.

6. An information storage matrix comprising a plurality of information planes and a reference plane, each of said planes comprising a coordinate array of corresponding magnetic storage elements, each of said elements being capable of assuming stable remanence states representative of particular information values, a reference-sensing conductor serially inductively coupled to the storage elements of the coordinate array of said reference plane, a plurality of information-sensing conductors serially inductively coupled to the storage elements of the coordinate arrays of said information planes, respectively, said reference and sensing conductors having readout signals induced thereon responsive to the switching of particular elements in each of said reference and information planes from a particular remanence state to another, a strobe pulse generator energized responsive to a readout signal on said reference sensing conductor for generating a strobe signal, a plurality of gating means each having a pair of inputs, and means for connecting said strobe pulse generator to one input of each of said gating means, the other input of each of said gating means being connected respectively to said plurality of information-sensing conductors, said plurality of gating means being severally enabled by the coincidence of said strobe pulse and readout signals on said connected information sensing conductors to provide output signals indicative of said particular remanence states of said particular storage elements.

7. An information storage matrix according to claim 6 in which each of the magnetic storage elements of said coordinate arrays of said reference and information planes comprises a toroidal magnetic core.

8. An information storage matrix according to claim 6 in which each of said gating means comprises an amplifier means.

9. In combination, a memory matrix means for storing a plurality of information words, each word comprising a predetermined combination of binary characters, said matrix means having a plurality of information sensing conductors associated respectively with corresponding information character addresses of each of said words, particular ones of said information-sensing conductors being energized during the readout of a particular word from said matrix means to provide information readout signals when the associated character addresses of said particular word each contain a particular one of said binary characters, a reference information address means containing said particular one of said binary characters, a reference sensing conductor associated with said reference address means energized during said readout of said particular word to provide a reference readout signal, a strobe pulse generator energized responsive to said reference readout signal for generating a strobe signal, gating means connected to each of said particular ones of said information-sensing conductors, and means for enabling said gating means comprising circuit means for applying said strobe signal to each of said gating means.

10. The combination as claimed in claim 9 in which each of said gating means comprises an amplifier means energized responsive to the coincidence of said strobe signal and an information readout signal indicative of said particular one of said binary characters.

11. A magnetic memory matrix comprising a plurality of information word storage means each comprising a plurality of magnetic means for storing a plurality of information bits and a reference bit in the form of a particular remanent flux state, a plurality of sensing conductor means associated respectively with corresponding magnetic means of said plurality of word storage means, means for simultaneously switching said particular remanent flux states in a selected one of said word storage means to generate information readout signals and a reference readout signal on said sensing conductor means, means responsive to said reference readout signal for generating a strobe signal, and means responsive to said strobe signal for strobing said information readout signals.

12. An information storage arrangement comprising a plurality of magnetic storage elements including a reference storage element, each of said elements being capable of storing a first and a second binary value in the form of one or the other stable remanence state, said reference element having a first binary value stored therein, a sensing conductor inductively coupled to each element of said plurality of storage elements, readout means for simultaneously switching the remanence state of each of said elements having said first binary value stored therein to thereby induce readout signals in said coupled sensing conductors, a strobe pulse generator connected to the sensing conductor coupled to said reference storage element energized responsive to the readout signal induced in said last mentioned conductor for generating a strobe signal, a plurality of amplifier means associated respectively with said plurality of sensing conductors except the sensing conductor coupled to said reference storage element, and means for exclusively energizing each of said amplifier means comprising circuit means for applying said strobe signal to one control input of each of said amplifiers and means for severally applying said readout signals induced in the sensing conductors coupled to said switching elements of said plurality of elements to another control input of each of said associated amplifier means.

13. In combination, a memory matrix means for storing binary "1's" and "0's" arranged in information words, said matrix means having a plurality of information sensing conductors energized during read out to provide information readout signals representative of the binary "1's" of a particular word, a reference matrix for storing a binary "1" for each word of said memory matrix means, said reference matrix having a reference-sensing conductor energized during said read out to provide a reference readout signal, a strobe pulse generator energized responsive to said reference readout signal for generating a strobe signal, a plurality of amplifier-gating means connected respectively to said information sensing conductors and to said strobe generator, each of said amplifier-gating means energized responsive to the coincidence of said strobe signal and said information readout signals to provide output signal conditions indicative of the binary "1's" and "0's" of said particular word.

14. The combination as claimed in claim 13 in which said memory matrix means comprises coordinate arrays of toroidal magnetic cores, each being capable of storing a binary value in one or the other state of remanent magnetization.

15. The combination as claimed in claim 14 in which said reference matrix also comprises a coordinate array of said toroidal magnetic cores.

16. An information storage arrangement comprising memory means having a first information storage element at a first information address therein and a second information storage element at a second information address therein, an information-sensing conductor serially associated with each of said information addresses, and means for strobing readout signals appearing on an output end of said information sensing conductor originating at said first information address at a first time and originating at said second information address at a second time comprising a first reference storage element at a first reference address corresponding to said first information address and a second reference storage element at a second reference address corresponding to said second information address, each of said reference storage elements having a particular binary value stored therein, a reference sensing conductor serially associated with each of said reference addresses, said reference sensing conductor being energized during read out at said first time and at said second time to provide a reference readout signal at each of said times indicative of said particular binary values, a strobe pulse generator energized responsive to said reference readout signals for generating a strobe signal at each of said times, and gating means connected to the output end of said information sensing conductor enabled responsive to said strobe signal for gating only readout signals representative of said particular binary value.

17. An information storage arrangement comprising a memory matrix for storing a plurality of binary words, each of said words including a reference bit and a plurality of information bits, said reference bit being a binary "1", a plurality of information sensing conductors for sensing corresponding information bits of said words, a reference-sensing conductor for sensing corresponding reference bits of said words, readout means for simultaneously inducing readout signals on each of said reference and information sensing conductors representative of binary "1's" of a selected word of said matrix, a strobe signal generator energized responsive to the readout signal on said reference-sensing conductor for generating a strobe signal, a plurality of amplifier-gating means connected respectively to said information sensing conductors, and circuit means for applying said strobe signal to each of said amplifier-gating means each of said amplifier-gating means being energizable responsive to the coincident application of said strobe signal and a readout signal representative of a binary "1" on the connected information-sensing conductor for generating an amplified output signal also representative of said last-mentioned binary "1".

18. In electronic data processing equipment a memory system which comprises: a plurality of first magnetic elements each having a substantially rectangular hysteresis curve characteristic and substantially identical electrical and thermal sensitivity; at least one second magnetic element having substantially the same hysteresis characteristic and electrical and thermal sensitivity as said first magnetic elements; common driving circuit means arranged to apply read and write current pulses to said first magnetic elements and said same read and write pulses to said at least one second element; means for deriving first output signals from said first magnetic elements in response to said read current pulses; means for deriving second output signals from said second magnetic element or elements in response to said same read current pulses; signal response means actuated by said first output signals; and gating means comprising an AND gate having a first input connected to said means for deriving first output signals and a second input connected to said means for deriving second output signals wherein means is provided to cause signals arriving at said second input to follow in time corresponding signals arriving at said first input.

* * * * *